(12) United States Patent
Lango et al.

(10) Patent No.: US 9,292,331 B2
(45) Date of Patent: Mar. 22, 2016

(54) EXPANSION OF SERVICES FOR A VIRTUAL DATA CENTER GUEST

(71) Applicant: Bracket Computing, Inc., Sunnyvale, CA (US)

(72) Inventors: Jason A. Lango, Mountain View, CA (US); James J. Voll, Palo Alto, CA (US); Andrew G. Tucker, Portola Valley, CA (US)

(73) Assignee: Bracket Computing, Inc., Sunnyvale, CA (US)

( * ) Notice: Subject to any disclaimer, the term of this patent is extended or adjusted under 35 U.S.C. 154(b) by 330 days.

(21) Appl. No.: 13/842,670

(22) Filed: Mar. 15, 2013

(65) Prior Publication Data

US 2014/0282521 A1    Sep. 18, 2014

(51) Int. Cl.
*G06F 9/455* (2006.01)

(52) U.S. Cl.
CPC ........ *G06F 9/45558* (2013.01); *G06F 9/45533* (2013.01)

(58) Field of Classification Search
None
See application file for complete search history.

(56) References Cited

U.S. PATENT DOCUMENTS

| | | | |
|---|---|---|---|
| 7,865,893 B1 * | 1/2011 | Omelyanchuk et al. | 718/1 |
| 8,151,264 B2 * | 4/2012 | Bennett et al. | 718/1 |
| 8,271,978 B2 * | 9/2012 | Bennett et al. | 718/1 |
| 8,370,838 B1 * | 2/2013 | Omelyanchuk et al. | 718/1 |
| 8,812,871 B2 * | 8/2014 | Monclus et al. | 713/190 |
| 8,874,823 B2 * | 10/2014 | Joshi et al. | 711/6 |
| 8,881,145 B2 * | 11/2014 | Chiueh et al. | 718/1 |
| 2007/0028238 A1 * | 2/2007 | Bennett et al. | 718/1 |
| 2011/0296201 A1 * | 12/2011 | Monclus et al. | 713/190 |

FOREIGN PATENT DOCUMENTS

| | | |
|---|---|---|
| EP | 1701259 A2 | 9/2006 |
| EP | 1750199 A1 | 2/2007 |

OTHER PUBLICATIONS

European Patent Office, "Search Report" in application No. PCT/US2014/023811, dated Jul. 31, 2014, 8 pages.
Claims in European application No. PCT/US2014/023811, dated Jul. 2014, 4 pages.

* cited by examiner

*Primary Examiner* — Van Nguyen
(74) *Attorney, Agent, or Firm* — Hickman Palermo Becker Bingham LLP

(57) ABSTRACT

One or more services for enhancing guest utilization of a virtual machine and other VDC resources may be provided at the intermediary manager. In an embodiment, the intermediary manager intercepts a hypercall from a guest operating system that is separate from the intermediary manager. The intermediary manager determines that a particular intermediary service is associated with the hypercall and causes execution of service instructions associated with the particular intermediary service. The intermediary manager and guest operating systems may operate within a virtual machine hosted by a host machine and managed by a hypervisor. Embodiments may be useful in any of a virtualized enterprise computer system; a virtual machine infrastructure in a private data center; computing, storage or networking resources in a private cloud; computing, storage or networking resources of cloud service provider; and a hybrid cloud computing environment.

20 Claims, 6 Drawing Sheets

EXPANSION OF SERVICES FOR A VIRTUAL DATA CENTER GUEST

TECHNICAL FIELD

The present disclosure generally relates to techniques for enhancing guest utilization of virtual data center resources such as virtual machines and virtual storage.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Many enterprises and their computer systems utilize virtual machines provided by a virtual data center, such as a cloud service provider (CSP), and other virtualized resources, such as virtual storage, virtual computing resources, or virtual database resources that are accessible through the internet. Such cloud services may provide a client with many benefits, such as reduced costs, easier scalability, and a reduced administrative burden. However, cloud services also pose new challenges for clients of these services, such as increased security risks or inconsistent performance. Clients of such cloud services would benefit by solutions that minimize such disadvantages, while requiring low implementation cost and effort.

SUMMARY OF THE INVENTION

The appended claims may serve to summarize the invention.

DESCRIPTION OF EXAMPLE EMBODIMENTS

Methods for expanding services for a guest of a virtual data center are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Implementation Mechanisms—Hardware Overview
4.0 Extensions and Alternatives

1.0 GENERAL OVERVIEW

According to an embodiment, an intermediary manager operates within a virtual machine hosted by a host machine and managed by a hypervisor. The intermediary manager manages one or more guest operating systems operating within the virtual machine and implements one or more services that enhance guest utilization of virtual data center (VDC) resources. The intermediary manager may provide one or more of various advantages to a VDC guest that expand on the services provided to the guest by the VDC. In this context, a virtual data center or VDC refers to any of one or more virtualized enterprise computer systems, virtual machine infrastructure in a private data center, computing, storage or networking resources in a private cloud, resources in a public cloud such as that offered by a cloud service provider (CSP), and hybrid cloud computing environments.

Among others, intermediary manager services may include data encryption, antivirus monitoring, and data throttling. The services may also provide guests with easier access to remote VDC management systems for guest operating systems, where the remote VDC management systems manage and improve performance of VDC resources. Additionally, the intermediary guest manager may allow a guest operating system that is not compatible with a particular hypervisor to run within a virtual machine supported by the particular hypervisor.

The intermediary guest manager may provide some services by intercepting, from the guest operating systems, at least a portion of hypercalls directed to the host hypervisor. Insertion of services may be invisible to the underlying hypervisor and the guest(s) of the VDC and may not require any installation or additional configuration by the guest or the underlying hypervisor.

2.0 STRUCTURAL AND FUNCTIONAL OVERVIEW

Figure 1:
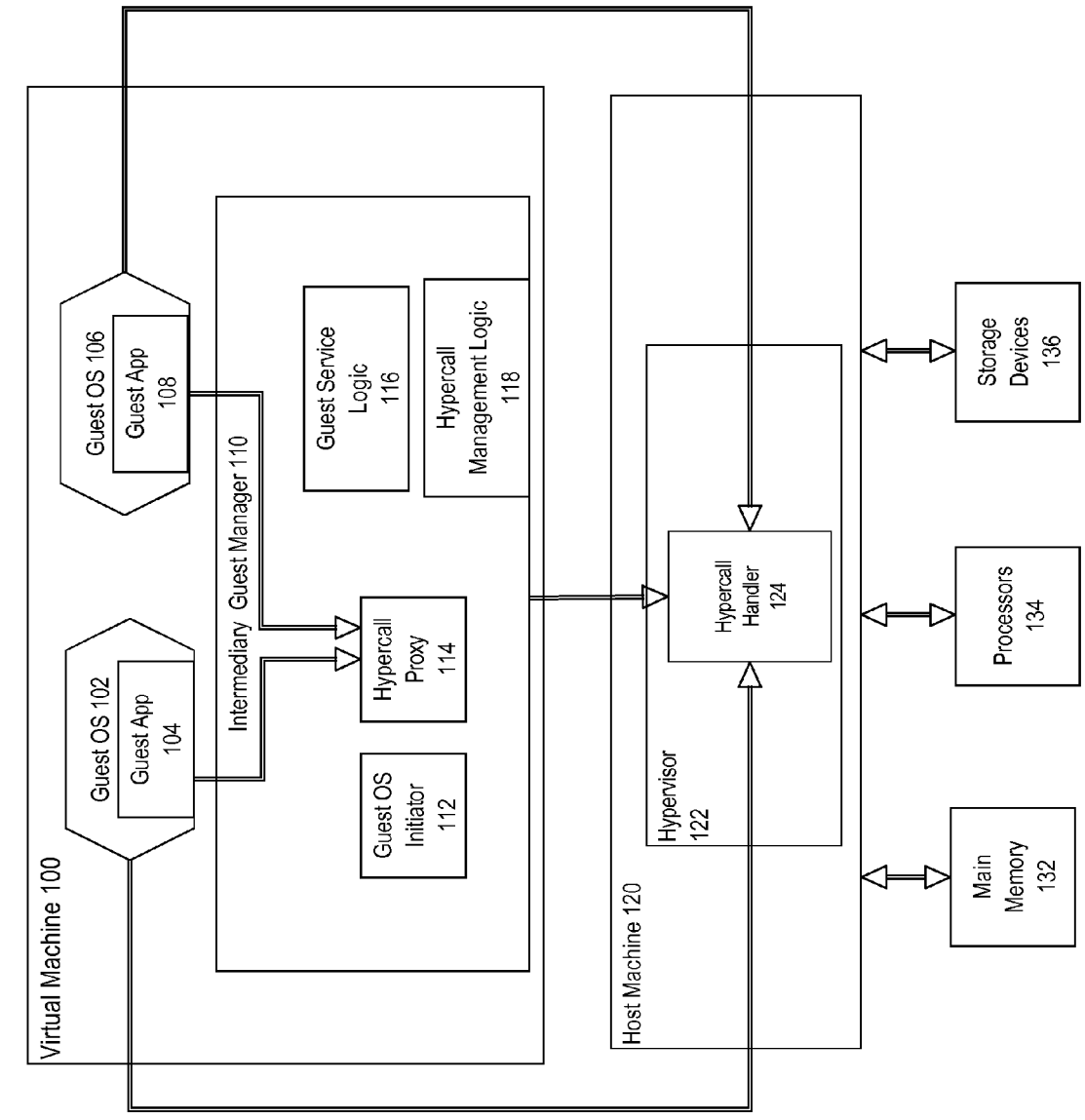
FIG. 1 illustrates an example networked computer system arrangement that may be used to implement an embodiment.

FIG. 1 illustrates an example networked computer system arrangement that may be used to implement an embodiment. Virtual machine 100 is a virtual machine hosted by host machine 120 and managed by hypervisor 122. Guest OS 102, 106 are guest operating systems within virtual machine 100. Guest OS 102, 106 may utilize hardware resources of host machine 120 or other VDC-provided resources. Resources of host machine 120 may be virtualized for a single guest, virtual machine 100, at least partially with the assistance of hypervisor 122. Guest OS 102 and 106 may not be separate virtual machines. For example, there may be no CPU virtualization, strict memory segmentation, or memory protection between guest OS 102 and 106. Other embodiments may include only a single guest operating system or may include more than two guest operating systems.

Guest OS 102 and 106 comprise guest applications 104 and 108. A client may control processes on guest operating systems 102 and 106 such as guest apps 104 and 108, at a client location that is remote from the location of host machine 120. Guest apps 104, 108 may initiate various hypercalls. Hypercalls, as used herein, include requests directed to hypervisor 122 of host machine 120, such as requests to access main memory 132, processors 134, storage devices 136, and request to utilize various VDC-provided resources such as VDC storage resources, VDC database resources, and VDC computing resources.

Guest OS 102, 106 may be managed, at least in part, by intermediary guest manager 110. Intermediary guest manager 110 may comprise logic for enhancing guest utilization of various VDC resources, such as VDC-hosted virtual machines or virtual storage. Intermediary guest manager 110 may include one or more of guest OS initiator 112, hypercall proxy 114, guest service logic 116, hypercall management logic 118. Guest OS initiator 112 initiates guest operating systems, such as guest OS 102, 106. Hypercall proxy 114 intercepts hypercalls from guest app 104 or guest app 108 that may be directed to hypervisor 122. Guest service logic 116 comprises instructions for performing one or more guest services that enhance guest utilization of VDC resources. Hypercall management logic 118 comprises instructions for managing hypercalls, such as instructions for ensuring that utilization of memory by guest OS 102, 106 does not interfere with utilization of memory by intermediary guest manager 110.

Intermediary guest manager 110 may operate on a different type of operating system than guest OS 102 and/or guest OS 104. Guest OS 102 and 104 may also be different types of operating systems in some embodiments.

Hypervisor 122 within host machine 120 may comprise hypercall handler 124. Hypercall handler 124 may receive calls from guest OS 102, 106 and/or intermediary guest manager 110. Host machine 120 may be communicatively coupled to main memory 132, processors 134, and/or storage devices 136. Guest app 104, 108 within Guest OS 102, 106 may utilize main memory 134, processor 134, and/or storage devices 136. Hypercalls handled by hypercall handler 124 may request utilization of main memory 132, processors 134, and/or storage devices 136.

Hypervisor 122 of FIG. 1 may present a software interface for communicating various hypercalls to the hypervisor, which may be used by processes within virtual machine 100. For example, hypervisor 122 may be a XEN hypervisor and guest OS 102, 106, and/or intermediary guest manager 110 may issue hypercalls to hypervisor 122 by sending a hypercall. XEN is currently developed by the Xen.org community.

Hypervisor 122 may not be notified of the separate guest operating systems within virtual machine 100 and may not sub-partition virtual machine 100 resources to create separate partitions for intermediary guest managers 110 or and/or other guest operating system(s). Hypervisor 122 may interpret calls received from the plurality of guest operating systems and/or from intermediary guest manager 110 to be from a single guest.

Figure 2:
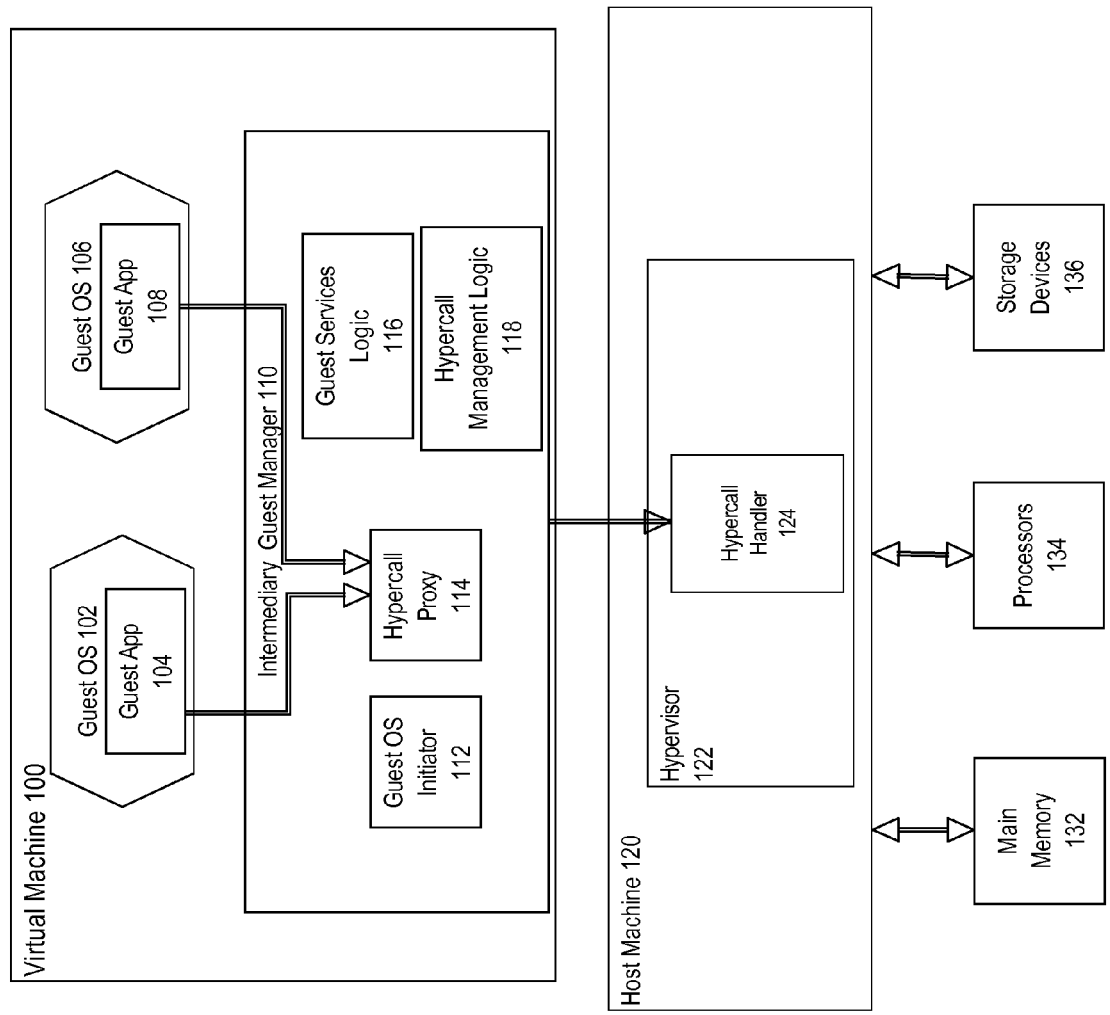
FIG. 2 illustrates another example networked computer system arrangement that may be used to implement an embodiment.

FIG. 2 illustrates another example networked computer system arrangement that may be used to implement an embodiment. Hypervisor 122 of FIG. 2 may be a non-paravirtualized hypervisor that does not accept hypercalls from a guest for causing various system operations. Hypervisor 122 may be a hypervisor that provides a hardware-based virtualization to virtual machine 100, such as LINUX KVM or MICROSOFT HYPER-V, and intermediary guest manager 110 may access the physical hardware of host machine 120 to implement various hypercalls intercepted by the intermediary guest manager from guest OS 102, 106. Intermediary guest manager 110 may access hardware resources such as main memory 132, processors 134, storage devices 136 via hypercall handler 124 in hypervisor 122.

In an embodiment, a guest operating system that is not configured to be directly operable with a hypervisor of a particular host machine may be a guest of the host machine.

For example, in an embodiment, guest OS 102, 106 of FIG. 2 are paravirtualized guests that expect to communicate with host machine 120 via hypercalls. Intermediary guest manager 110 may allow such operating systems to also be guests of host machines having hypervisors that do not support paravirtualized guests and do not accept hypercalls. For example, guest OS 102, 106 of FIG. 2 may only be compatible with a XEN hypervisors, and hypervisor 122 may be a non-paravirtualized hypervisor such as KVM or HYPER-V. In such embodiments, intermediary guest manager 110 may accept hypercalls from guest OS 102 or 106 and may emulate the requested hypercall or directly communicate with the hardware of host machine 120 to cause completion of the hypercall. Thus, intermediary guest manager 110 may expand the types of host machines a guest operating system may operate on.

In an embodiment, guest operating systems 102, 106, and intermediary guest manager 110 are not within any virtual machine. Instead the guest operating system(s) and the intermediary guest manager may be at the same host machine, which lacks any hypervisor. Guest operating systems 102, 106 may still issue hypercalls directed to a particular hypervisor and intermediary guest manager 110 may intercept the hypercalls and cause performance of service code associated with the hypercall.

Despite guest operating systems 102, 106 being configured for a host machine with a paravirtualized hypervisor that accepts hypercalls, intermediary guest manager 110 may enable the guest operating system(s) to be hosted at a host machine that has a non-paravirtualized hypervisor or a host machine that lacks a hypervisor altogether. Guest operating systems 102, 106 may issue requests for a paravirtualized hypervisor and intermediary guest manager 110 may intercept those calls despite not being a hypervisor, in some embodiments. For example, intermediary guest manager 110 may lack the capabilities required to initiate and manage virtual machines, such as CPU virtualization and strict memory segmentation.

Guest operating systems 102, 106 may be configured for compatibility with any of a variety of host hypervisors including, but not limited to, as XEN or HYPER-V. In an embodiment, guest operating systems 102 and 106 are configured for paravirtualization. Guest operating systems 102, 106 may request the performance of privileged operations by issuing hypercalls.

Figure 3:
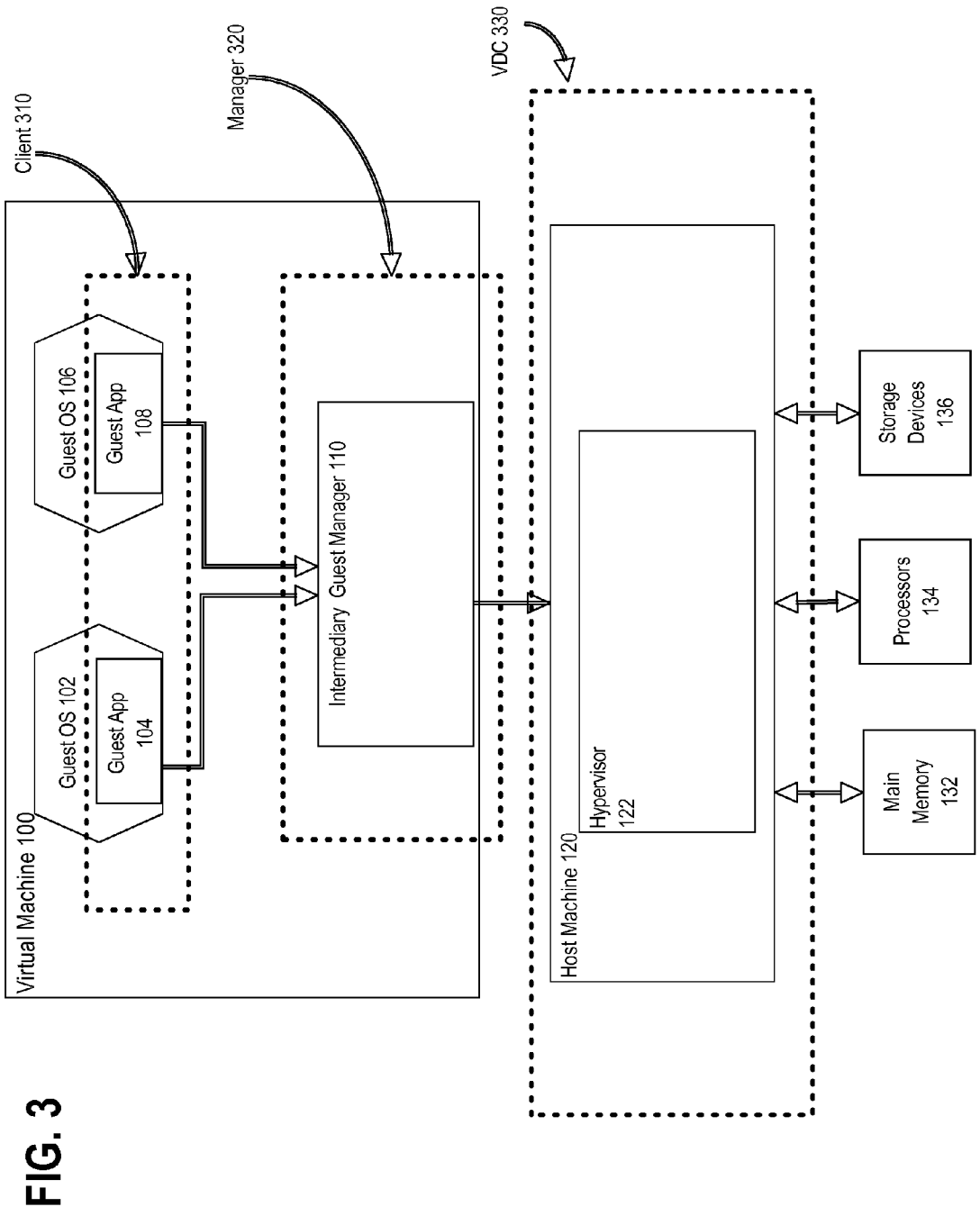
FIG. 3 illustrates an example context of an example networked computer system arrangement according to an embodiment.

FIG. 3 illustrates an example context of an example networked computer system arrangement according to an embodiment. Client 310 may control the execution of logic within guest OS 102, 106, such as guest app 104, 108. Manager 320 may control the logic within intermediary guest manager 110. VDC 330 may control the logic within host machine 120, including the logic of hypervisor 122.

Manager 320 may be a different entity than VDC 330 and client 310. Thus, manager 320 may insert service logic within intermediary guest manager 110 for enhancing guest utilization of VDC resources without requiring any action from VDC 330 or client 310 or any installation on systems controlled by the VDC or the client.

According to various embodiments, one or more features illustrated in FIGS. 1, 2, 3 may be omitted or located elsewhere.

Figure 4:
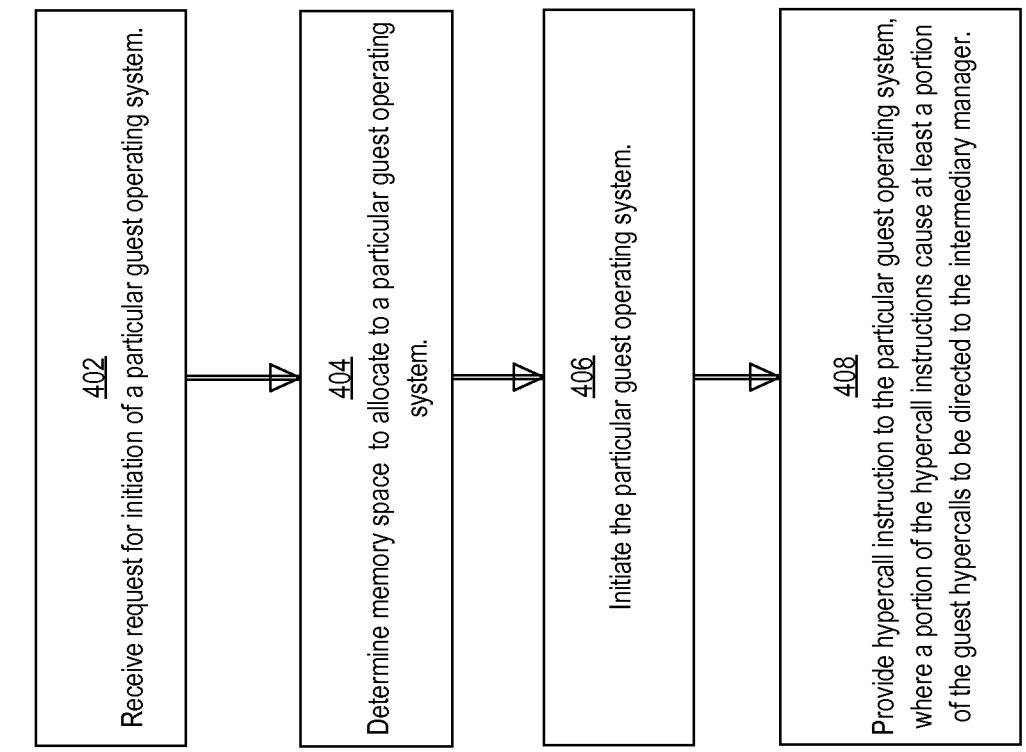
FIG. 4 illustrates an example method for the initiation of a guest operating system.

FIG. 4 illustrates an example method for the initiation of a guest operating system. The method of FIG. 4 may be implemented using one or more computer programs, other software elements, or other functional logic at guest OS initiator 112 within intermediary guest manager 110. At block 402, guest OS initiator 112 at intermediary guest manager 110 receives a request for the initiation of a particular guest operating system. The request may be received from a client application operating at a different guest operating system or elsewhere.

At block 404, guest OS initiator 112 determines memory space to allocate to the particular guest operating system. Guest OS initiator 112 may determine the portion of memory to allocate based on the entire memory portion allocated to virtual machine 100 by host machine 120. Guest OS initiator 112 may designate a portion of the memory allocated to the virtual machine 100 for intermediary guest manager 110, and may determine that at least a portion of the remainder of the memory space allocated to the virtual machine 100 is to be allocated to the particular guest OS.

At block 406, guest OS initiator 112 initiates the particular guest operating system. Guest OS initiator 112 may indicate to the particular guest OS its allocated memory space. At block 408, guest OS initiator 112 provides a set of hypercall definitions to the particular guest OS, where at least a portion of the hypercall definitions cause at least a portion of the guest hypercalls to be directed to the intermediary manager. In an embodiment, guest OS initiator 112 provides a set of hypercall definitions to the particular guest OS by storing a specialized hypercall page in a portion of the memory allocated to the guest OS during initializations. A guest OS may make hypercalls to hypervisor 122 by executing a particular hypercall defined in the hypercall page. The hypercall page may define the function, which when executed, communicate hypercall information to hypervisor 122. The specialized hypercall page may include one or more modified hypercall definitions, where the modified hypercall definitions causes hypercall information to be sent to hypercall proxy 114 at intermediary guest manager 110 instead of hypercall handler 124 at hypervisor 122. By using a specialized hypercall page, intermediary guest manager 110 may intercept particular hypercalls initiated by guest operating system(s). The particular hypercalls that are intercepted by intermediary guest manager 110 may vary according to different embodiments.

In an embodiment, the set of hypercall definitions may cause all hypercalls to be routed to intermediary guest manager 110 instead of hypervisor 122. In such an embodiment, hypervisor 122 may be a hypervisor that does not allow guests of host machine 120 to request action or information by means of a hypercall.

In other embodiments, the set of hypercall definitions may cause some systems calls to be routed to intermediary guest manager 110 and some hypercalls to be routed directly to hypervisor 122. For example, the hypercall definition may cause all requests that access memory to be sent to intermediary guest manager 110. Intermediary guest manager may ensure memory related requests by a guest are not affecting memory belonging to the intermediary guest manager 110 or other guests.

The hypercall definition may also cause hypercalls that are associated with inserted services to be sent to intermediary guest manager 110. For example, data input or output operations may be associated with particular intermediary services. Therefore, intermediary guest manager 110 may cause all hypercalls requesting to read or store data to be sent to intermediary guest manager 110. The hypercall definition may send other requests, such as requests that do not access memory and are not associated with a service, to be sent to hypervisor 122 directly. For example, the set of hypercall definitions may indicate that calls related to processor management, such as calls to determine the CPU state or to cause a context switch are to be sent directly to hypervisor 122.

Figure 5:
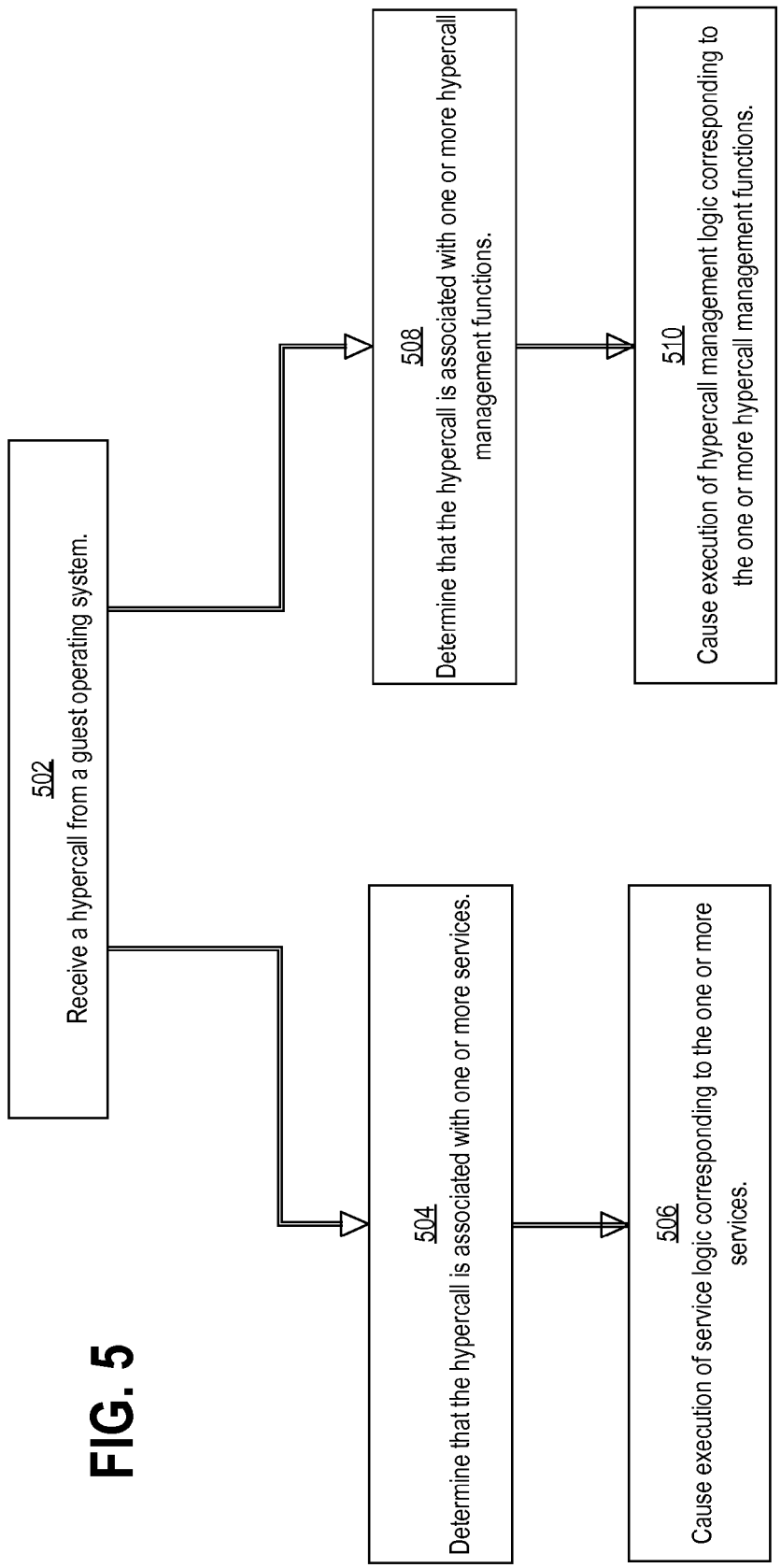
FIG. 5 illustrates an example method for handling a hypercall from a guest operating system.

FIG. 5 illustrates an example method for handling a hypercall from a guest operating system. Portions of method of FIG. 5 may be implemented using one or more computer programs, other software elements, or other functional logic at hypercall proxy 114, guest service logic 116, and hypercall management logic 118 of intermediary guest manager 110.

At block 502, hypercall proxy 114 receives a hypercall from a guest operating system. Hypercall proxy 114 may determine whether the hypercall is associated with a service or management function, or both. Some hypercalls may be associated with both a service and a state management function. Other hypercalls may be associated with only a service or a management function, or neither.

At block 504, hypercall proxy 114 determines that the hypercall is associated with one or more services. At block 506, hypercall proxy 114 causes execution of service logic corresponding to the one or more services associated with the hypercall. Hypercall proxy 114 may cause the one or more associated services to be performed by invoking guest service logic 116.

At block 508, hypercall proxy 114 determines that the hypercall is associated with one or more hypercall management functions. At block 510, hypercall proxy 114 causes execution of hypercall management logic corresponding to the one or more hypercall management functions associated with the hypercall. Hypercall proxy 114 may cause performance of the one or more associated hypercall management functions by executing at least a portion of hypercall management logic 118.

Management functions may be functions performed by intermediary guest manager 110 to allow one or more guest operating systems and intermediary guest manager 110 to run within a single virtual machine. For example, a particular hypercall management function may be associated with all calls that access or utilize memory and the particular hypercall management function may be to ensure that the particular portion of memory being utilized or access by the hypercall is not in use by a different guest OS or intermediary guest manager 110.

A service may be a function performed by virtual machine 100 to enhance guest utilization of VDC resources. The particular services performed by intermediary guest manager 110 may vary according to different embodiments.

In some embodiments, intermediary guest manager 110 manager performs data encryption services. In response to hypercall proxy 114 determining that an incoming call is to store or retrieve data, hypercall proxy 114 may invoke data encryption service logic. For a request to store data, data encryption services may encrypt the data before saving to a storage unit. For a request to retrieve data, data encryption services may decrypt the data after retrieving the data from a storage unit and may return decrypted data to the requesting guest operating system. Intermediary guest manager 110 may store the encryption key for the encryption and decryption. Storing the encryption key at intermediary guest manager 110 may be more secure than storing the encryption key at a guest operating system because an encryption key stored at intermediary guest manager 110 may not be accessible to malicious intruders of the guest operating system, such as RAM scrapers. Similarly, other sensitive information may be stored at intermediary guest manager 110 instead of at a guest operating system for increased security.

In another embodiment, intermediary guest manager 110 provides a service of increased access to resources. Guest operating systems 102, 106 may need to communicate with various remote resources such as VDC storage units and/or other virtual machines. For example, guest OS 102 or 106 may need to communicate with a VDC storage unit that stores guest data utilized by guest app 104 or 108. However, an entity may be required to install and configure special software to communicate with the remote resources. For example, an entity may only communicate with a VDC storage unit or virtual machines using the iSCSI protocol. The iSCSI protocol may allow an entity to communicate with remote resources as if they are locally attached devices. However, sending communications over the iSCSI protocol may only be possible if the sending entity has iSCSI initiator software installed and properly configured, which is often a cumbersome process. Traditional approaches would require modifying a client system to install and configure the iSCSI initiator software.

A system where the iSCSI initiator software is installed at intermediary guest manager 110 may allow guest operating systems 102 and 106 to communicate with remote resources that only accept communications via the iSCSI protocol without having to install any software. For example, guest operating systems 102 or 106 may communicate with remote VDC storage units or virtual machines by sending a hypercall comprising a request to communicate with a locally-attached storage unit that is intercepted by hypercall proxy 114 at intermediary guest manager 110. Upon intercepting the hypercall, intermediary guest manager 110 may send communication to the remote resources using iSCSI protocol on behalf of the guest operating system. Thus, a guest operating system may communicate with a remote resource as if it is a locally-attached resource. Intermediary guest manager 110 may also receive communications via the iSCSI protocol and may forward such communications to the appropriate guest operating system.

In some embodiments, intermediary guest manager 110 enables guest operating systems 102 and 106 to communicate with a remote virtual machine that manages various VDC storage units or other VDC resources on behalf of the guest operating system. The external virtual machines may be resource administrator 106, as described in U.S. patent application Ser. No. 13/837,375, filed Mar. 15, 2013, titled Storage Unit Selection For Virtualized Storage Units, or storage administrator 106, as described in U.S. patent application Ser. No. 13/873,456, filed Mar. 15, 2013, titled Automatic Tuning of Virtual Data Center Resource Utilization Policies, both of which are herein incorporated by reference in their entirety.

Intermediary guest manager 110 may enable guest operating systems 102 or 106 to communicate with the external virtual machine by sending communications to, or receiving communications from, the remote virtual machine on behalf of the guest operating system. Utilization of VDC resources by guest operating systems 102, 106 may be enhanced by communicating with the remote managing virtual machines, which may cause improvement in quality and consistent of various VDC resources.

In an embodiment, intermediary guest manager 110 provides a traffic control service. The traffic control service may monitor and control the amount or speed of traffic generated by one or more guest operating systems, such as guest operating system 102 or 106. Hypercall proxy 114 may invoke traffic controls service logic in response to receiving a hypercall from a particular guest operating system that includes a request to send or retrieve data. The traffic control service may monitor the amount of traffic generated from the particular guest operating system and, if the amount of traffic exceeds a particular threshold amount of traffic permissible during a given time period, intermediary guest manager 110 may limit the particular guest operating system's ability to send or retrieve data. Intermediary guest manager 110 may prevent the particular guest operating system from generating traffic, at least in part, by preventing the completion of one or more data storage or retrieval requests by the guest operating system. A traffic throttling service may ensure that an individual guest operating system does not utilize a disproportional share of resources or that an intruder to a guest operating system does not succeed in implementing a denial of service attach by flooding one or more targets with an abundance of request.

As another example, intermediary guest manager 110 may provide an antivirus service. The antivirus service may scan portions of memory allocated to one or more guest operating systems or various VDC resources utilized by the guest operating systems, to detect malicious data or other evidence of an intrusion. In some embodiments, intermediary guest manager 110 is capable of scanning memory allocated to guest operating systems within virtual machine 100 partially due to the fact that memory is not strictly partitioned between guest operating system 102, 106 and intermediary guest manager 110. The logic of some services, such as the antivirus service, may execute automatically instead of being caused to execute in response to a hypercall from a guest operating system.

Software that may otherwise require installation at each guest operating system within virtual machine 100 may instead be installed at a single location, as a service within intermediary guest manager 110. This approach would still expose the functionality of the software to each separate guest operating system, because intermediary guest manager 110 may intercept the guest operating system's hypercalls.

For example, installing antivirus software at intermediary guest manager 110 may provide many advantages over installing antivirus software at each guest operating system within virtual machine 100. Because the antivirus software is installed at single location, within intermediary guest manager 110, antivirus software developers may provide updated security to all guest operating systems by only updating the single version of the antivirus software located within guest service logic 116 to. Furthermore, the antivirus software need not be compatible with the one or more different operating systems of the guest operating systems within virtual machine 100. The antivirus software may only be compatible with the operating system of intermediary guest manager 110.

In some embodiments, intermediary guest manager 110 causes the performance of the action requested by the hypercall. The requested action may be completed by performing the associated service or hypercall management functions or may be completed after the service or management function has been performed. For example, if the hypercall is a request to read from memory, hypercall proxy 114 may cause the requested information to be retrieved from memory and returned to the request guest operating system. For hypervisors that support the receipt of systems calls, hypercall proxy 114 may cause the requested information to be retrieved from memory and returned to the request guest operating system at least in part by sending a hypercall to hypervisor 122 requesting the memory information. In other embodiments, such as embodiments where hypervisor 122 does not accept hypercalls, hypercall proxy 114 may cause the requested information to be retrieved from memory and returned to the request guest operating system at least in part by accessing memory of host machine 120 via hypercall handler 124.

In an embodiment, intermediary guest manager 110 provides a memory snap shot service. The service may capture the state of each portion of memory utilized by one or more guest operating system(s) 102, 106 as a memory snapshot, or each portion of memory utilized by the virtual machine 100 including portions of memory utilized by guest OS 102, 106 and intermediary guest manager 110. The memory snapshot may be utilized at a later time to re-initiate guest operating machine(s) 102, 106 to the same state as captured, or may be used for a different purpose.

In an embodiment, memory snapshots are utilized to cause the migration of one or more guest operating system(s) to a different virtual machine, different host machine, and/or different VDC. For example, host machine 120 may be hosted by a first cloud service provider and intermediary guest manager 110 may cause a new virtual machine hosted by a second cloud service provider to have the same state as virtual machine 100. Intermediary guest manager 110 may cause the new virtual machine to have the same state as virtual machine 100 by causing the state of the memory of the new virtual machine be the same as the state identified by the memory snapshot. Intermediary guest manager's migration service may cause the migration to occur automatically in response to a detected triggering condition, such as failure of VDC resources.

The virtual machine being replaced may be linked to one or more VDC resources such as storage units. Intermediary guest manager 110 may cause the new virtual machine to be linked to the same VDC resources, or may cause a new set of VDC resources to be initiated as replicas of the prior VDC sources. Intermediary guest manager 110 may cause the replica VDC resources to be linked to the new virtual machine.

According to various embodiments, one or more steps of the methods illustrated in FIGS. 4, 5 may be omitted or may be performed in a different order.

3.0 IMPLEMENTATION MECHANISMS—HARDWARE OVERVIEW

Figure 6:
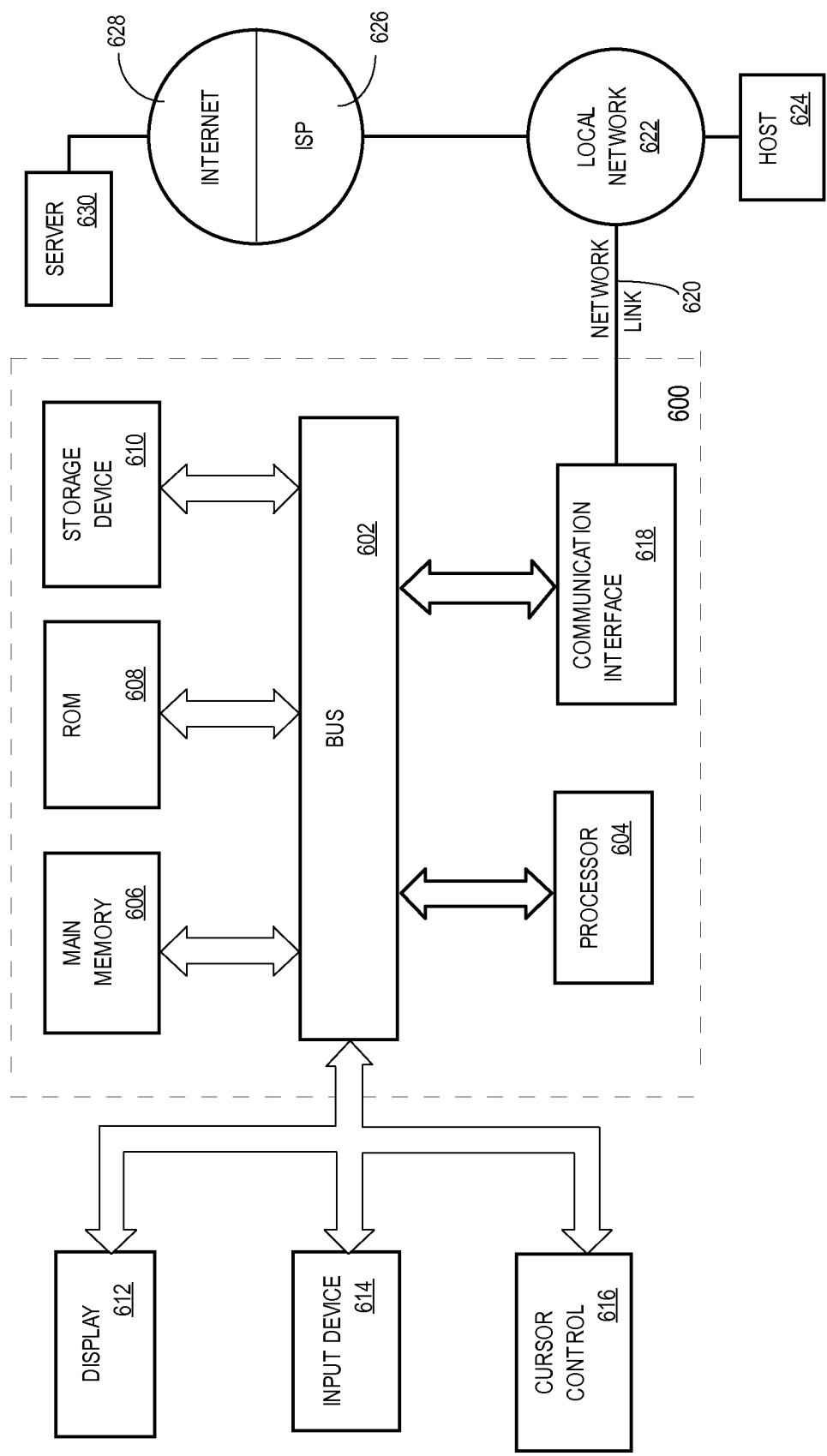
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to storage media and transmission media. Storage media includes both non-volatile media and volatile media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

4.0 EXTENSIONS AND ALTERNATIVES

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   determining, at an intermediary manager, whether a guest operating system located at the same virtual machine as the intermediary manager is operable with a particular hypervisor that is separate from the intermediary manager, wherein the intermediary manager is not the particular hypervisor;
   in response to determining that the guest operating system is not operable with the particular hypervisor:
      intercepting, at the intermediary manager from the guest operating system, a hypercall directed to the particular hypervisor that is separate from the intermediary manager;
      determining that a particular intermediary service is associated with the hypercall;
      causing execution of service instructions associated with the particular intermediary service; and
      providing a set of hypercall function definitions to the guest operating system, wherein at least one hypercall function definition causes a corresponding hypercall to be sent to the intermediary manager,
   wherein a particular hypercall function definition of the set of hypercall function definitions indicates that hypercalls corresponding to the particular hypercall function definition are to be sent to the intermediary manager, and
   wherein the method is performed by one or more computing devices.

2. The method of claim 1, wherein the guest operating system and the intermediary manager operate within a virtual machine hosted by a host machine and managed by a host hypervisor.

3. The method of claim 2, wherein the intermediary manager is controlled by a manager that is different from a cloud service provider that controls the host machine and a client that controls execution of logic within the guest operating system.

4. The method of claim 2, wherein the guest operating system is one of a plurality of guest operating systems operating within the virtual machine.

5. The method of claim 2, wherein the guest operating system is not configured to be directly operable with the host hypervisor.

6. The method of claim 1, wherein the guest operating system and the intermediary manager operate within a virtual machine hosted by a host machine and managed by a host hypervisor; and
   the set of hypercall function definitions comprises a certain hypercall function definition for a certain hypercall relating to processor management and the certain hypercall function definition indicates that hypercalls corresponding to the certain hypercall function definition are to be sent directly to the host hypervisor.

7. The method of claim 1, wherein the hypercall is a request to retrieve data from, or store data in, a locally attached resource and the service instructions cause retrieval or storing of data from a non-locally attached resource.

8. The method of claim 1, wherein the hypercall is a request to retrieve or store data and the service instructions cause encryption or decryption of the data.

9. The method of claim 1, wherein the hypercall is a request to retrieve data or store data and the service instructions cause determining whether an amount of data sent from or to the guest operating system is permissible based on data restrictions applicable to the guest operating system.

10. The method of claim 1, wherein the guest operating system is a different type of operating system than an operating system of the intermediary manager.

11. A non-transitory computer-readable storage medium comprising one or more sequences of instructions which when executed by one or more processors cause the one or more processors to perform:
    determining, at an intermediary manager, whether a guest operating system located at the same virtual machine as the intermediary manager is operable with a particular hypervisor that is separate from the intermediary manager, wherein the intermediary manager is not the particular hypervisor;
    in response to determining that the guest operating system is not operable with the particular hypervisor:
       intercepting, at the intermediary manager from the guest operating system located a hypercall directed to the particular hypervisor that is separate from the intermediary manager,
       determining that a particular intermediary service is associated with the hypercall;
       causing execution of service instructions associated with the particular intermediary service; and
    providing a set of hypercall function definitions to the guest operating system, wherein at least one hypercall function definition causes a corresponding hypercall to be sent to the intermediary manager;

wherein a particular hypercall function definition of the set of hypercall function definitions indicates that hypercalls corresponding to the particular hypercall function definition are to be sent to the intermediary manager.

12. The non-transitory computer-readable storage medium of claim 11, wherein the guest operating system and the intermediary manager operate within a virtual machine hosted by a host machine and managed by a host hypervisor.

13. The non-transitory computer-readable storage medium of claim 12, wherein the guest operating system is one of a plurality of guest operating systems operating within the virtual machine.

14. The non-transitory computer-readable storage medium of claim 12, wherein the guest operating system is not configured to be directly operable with the host hypervisor.

15. The non-transitory computer-readable storage medium of claim 12, wherein the intermediary manager is controlled by a manager that is different from a cloud service provider that controls the host machine and a client that controls execution of logic within the guest operating system.

16. The non-transitory computer-readable storage medium of claim 11, wherein the guest operating system and the intermediary manager operate within a virtual machine hosted by a host machine and managed by a host hypervisor; and the set of hypercall function definitions comprises a certain hypercall function definition for a certain hypercall relating to processor management and the certain hypercall function definition indicates that hypercalls corresponding to the certain hypercall function definition are to be sent directly to the host hypervisor.

17. The non-transitory computer-readable storage medium of claim 11, wherein the hypercall is a request to retrieve data from, or store data in, a locally attached resource and the service instructions cause retrieval or storing of data from a non-locally attached resource.

18. The non-transitory computer-readable storage medium of claim 11, wherein the hypercall is a request to retrieve or store data and the service instructions cause encryption or decryption of the data.

19. The non-transitory computer-readable storage medium of claim 11, wherein the hypercall is a request to retrieve data or store data and the service instructions cause
- determining whether an amount of data sent from or to the guest operating system is permissible based on data restrictions applicable to the guest operating system.

20. The non-transitory computer-readable storage medium of claim 11, wherein the guest operating system is a different type of operating system than an operating system of the intermediary manager.

* * * * *

UNITED STATES PATENT AND TRADEMARK OFFICE
CERTIFICATE OF CORRECTION

PATENT NO. : 9,292,331 B2
APPLICATION NO. : 13/842670
DATED : March 22, 2016
INVENTOR(S) : Jason A. Lango, James J. Voll and Andrew G. Tucker Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 337 days.

Signed and Sealed this
Fifth Day of July, 2016

Michelle K. Lee
*Director of the United States Patent and Trademark Office*